March 31, 1942.    R. MUELLER    2,277,775

INDUCTANCE DEVICE

Filed Sept. 26, 1940

INSULATED MAGNETIC PARTICLES

INVENTOR
R. MUELLER
BY
T.B.W. Jackson
ATTORNEY

Patented Mar. 31, 1942

2,277,775

UNITED STATES PATENT OFFICE 2,277,775

INDUCTANCE DEVICE

Robert Mueller, Westwood, N. J., assignor to Bell Telephone Laboratories, Incorporated, New York, N. Y., a corporation of New York Application September 26, 1940, Serial No. 358,411

7 Claims. (Cl. 175—356)

This invention relates to inductance devices and, more particularly, to a type of winding for such devices whereby a small value of effective capacitance of the winding is obtained.

The detrimental effect of the inherent capacitance of the windings of inductance devices is well known and in designing inductance devices, particularly transformers for use at frequencies of the order of $10^6$ cycles, a compromise is usually made between the capacitance of the windings and the leakage inductance, that is, in some cases large leakage inductance is accepted to attain low undesired capacitance effects while in other cases the leakage inductance is kept small by permitting the undesired capacitance to be large.

The present invention has as its main object an inductance device in which both the leakage inductance and capacitance of at least one of the windings of the device are kept at small values.

Another object of the invention is an inductance device in which the capacitance of each turn to ground of one winding is a minimum at the high potential end and a maximum at the low potential end.

A further object of the invention is an inductance device in which the turns of one winding are distributed over the entire length of the other winding to minimize the adverse effect of leakage while at the same time maintaining the capacitance to ground of the one winding at a small value.

These and other objects, as will appear hereinafter, are attained in one embodiment of the invention by varying the pitch of the turns of the one winding from a maximum at the low potential end to a minimum at the high potential end and at the same time distributing this winding over the entire length of the other winding.

The invention will be better understood from the following description and attached drawing forming a part thereof and in which.

Figure 1:
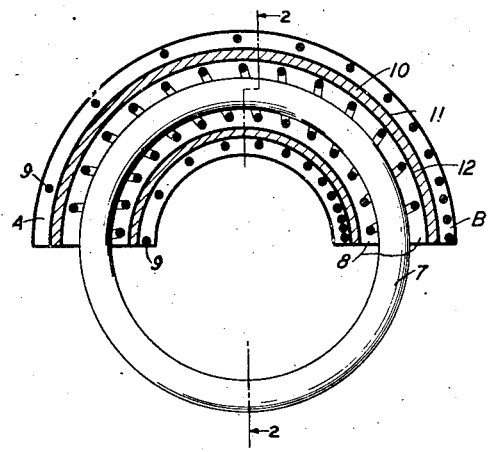
Fig. 1 is an elevation of the mid-section of a two-winding device embodying the invention.

The transformer of Fig. 1 comprises a toroidal core 7 of magnetic material and two windings 8 and 9. The material of the core may be of various compositions but for high frequencies the core is preferably a compressed form of very fine insulated dust particles of either iron or a magnetic alloy of iron such as described in Ellis Patent 1,943,115 of January 9, 1934; or a thin tape of magnetic material may be used.

The two windings are wound on one-half of the core, the primary winding 8 being wound next to the core and the secondary winding 9 being wound over winding 8. Fig. 1 represents a transformer in which the number of turns required necessitated the use of only one-half of the core but this should not be taken as a limitation of the invention since where the number of turns requires it the windings may extend over a greater amount of the core.

Between windings 8 and 9 is an electrostatic shield 10 and on each side of the shield are layers of insulation 11 and 12 in the conventional manner. A connection 13 is made between one end of winding 9 and shield 12.

Figure 2:
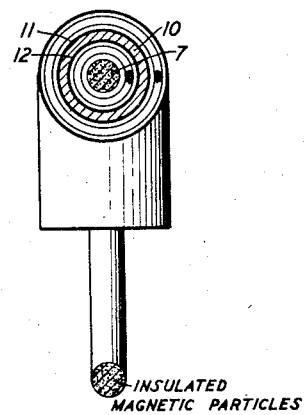
Fig. 2 is a view along line 2—2 of Fig. 1.
Figure 3:
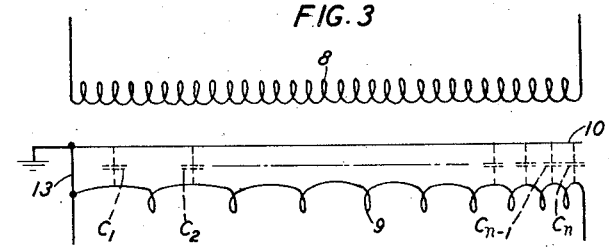
Fig. 3 is a schematic diagram of the distribution of the capacitances in one winding of the device of Fig. 1.
Figure 4:
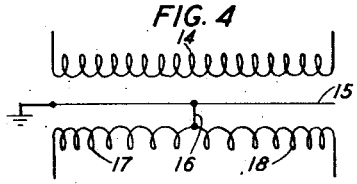
Figs. 4 and 5 illustrate schematically modifications of the invention.

In the case of a balanced coil the connection to the shield will be made from the electrical center of the winding as illustrated schematically in Fig. 4. In this figure winding 14 and shield 15 are of the same form as winding 8 and shield 10 shown in Figs. 1, 2 and 3. The other winding is composed of two parts 17 and 18 with the connection 16 to the shield 15 made at the junction of the two portions where the pitch of the windings is greatest.

The primary winding 8 is wound in the usual manner, that is, the spacing between turns is uniform and may comprise more than one layer.

The secondary winding 9 is wound with a varying pitch as shown, that is, at the low potential end A (where the shield is connected to the winding) the spacing between turns is greatest and this spacing gradually decreases toward the high potential end B. The spacing of the turns of the secondary winding is made such that this winding extends over the entire length of the primary winding.

Figure 5:
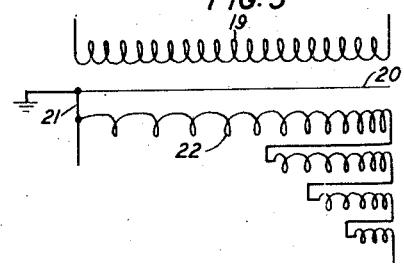

To accommodate the required number of turns it may be necessary at times to "bunch" the turns at the high end of one winding as schematically illustrated in Fig. 5. In this case as shown winding 19 and shield 20 are of the type previously described with a similar connection 21 from winding 22 to the shield. Winding 22 may be formed with the spacing between turns at the low end somewhat smaller than in the other forms of the windings described and at the high end of the winding there are several layers of turns with the number of turns per layer decreasing as the layers become further away from the shield.

The leakage inductance is reduced by having the secondary winding extend over the entire length of the primary winding. The use of a closed magnetic circuit also reduces the leakage inductance.

It is to be understood that, whereas a toroidal core is illustrated, any type of core may be used if the magnetic circuit is closed. For example, the lower half of core 7 may be replaced by a straight piece of magnetic material of the same composition as the remainder of the core or a shell type or any other continuous type of core may be used.

The reason why the winding arrangement of this invention brings about a reduction of the effective capacitance to ground of the secondary winding is illustrated schematically in Fig. 3 and will be described in connection therewith. In this figure the primary winding 8 is illustrated as having uniformly spaced turns. The shield 10 is shown grounded. Secondary winding 9 is shown as having varying spacing between turns. One end of winding 9 is connected by wire 13 to the grounded shield as shown and the spacing of the turns at this end is greatest. The secondary winding 9 is also shown as extending the entire length of primary winding 8. The capacitances between each turn of the secondary winding and the shield 10 are represented at $C_1, C_2, C_3 \ldots C_n$.

From Equation 36 on page 40 of K. S. Johnson's book "Transmission Circuits for Telephonic Communication," fourth printing, October 1929, it is seen that the impedance of a part of an inductive winding is inversely proportional to the square of the ratio of the number of turns in the part to the number of turns in the whole winding. That is, the total impedance looking into winding 9 having $n$ turns is the sum of the individual impedances in parallel and this impedance is $$Z_T = \frac{1}{\frac{1}{Z_1\left(\frac{n}{1}\right)^2} + \frac{1}{Z_2\left(\frac{n}{2}\right)^2} \cdots + \frac{1}{Z_{n-1}\left(\frac{n}{n-1}\right)^2} + \frac{1}{Z_n\left(\frac{n}{n}\right)^2}} \quad (1)$$

where $$Z_1 = \frac{1}{\omega C_1}, Z_2 = \frac{1}{\omega C_2} \ldots$$

substituting for $Z_1, Z_2 \ldots$ in (1)

$$Z_T = \frac{1}{\omega} \cdot \frac{1}{C_1\left(\frac{1}{n}\right)^2 + C_2\left(\frac{2}{n}\right)^2 \cdots + C_{n-1}\left(\frac{n-1}{n}\right)^2 + C_n\left(\frac{n}{n}\right)^2} \quad (2)$$

Equation 2 shows that only $$\left(\frac{1}{n}\right)^2$$

of the capacitance $C_1$ to ground of the first turn (numbering from the grounded end) is effective while $$\left(\frac{n}{n}\right)^2$$

or all of the capacitance $C_n$ of the $n$th turn is effective. That is that part of the actual value of the capacitance of each turn of the winding which is effective in the total impedance is proportional to the square of the number of the turn (numbered from the low end) divided by the square of the total number of turns in the winding. Hence, to keep the equivalent capacitance of the winding to ground at a small value, the capacitance of the first turn $C_1$ should be the largest since only a small part thereof is effective while the capacitance to ground of the $n$th turn $C_n$ should be the smallest since it is entirely effective. It is readily seen from Figs. 1 and 3 that capacitance $C_1$ of the first turn is a maximum since the spacing between the first and second turns is a maximum, thereby making the electrode area, which is determined by the shield area, a maximum while $C_n$ is a minimum since the corresponding shield area is a minimum. Such a winding will extend over the entire primary winding and will have a minimum effective capacitance and a minimum leakage inductance.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. An electrical transformer comprising a magnetic core, a winding on said core, a second winding on said core inductively coupled to said first winding and comprising a multiturn layer adjacent said first winding, a grounded electrostatic shield between said layer and said first winding and an electrical connection between said shield and a turn of said layer, the turns of said layer near said one turn being more widely spaced from each other than other turns of said layer remote from said one turn.

2. An electrical transformer in accordance with claim 1 in which the turns of said layer lying between said one turn and one end of said layer are so spaced that the capacitance between each turn thereof and said shield varies substantially progressively from a large value for the turns adjacent said one turn to a small value for the turns adjacent the said one end of said layer.

3. An electrical transformer in accordance with claim 1 in which the spacing between the individual turns lying between said one turn and one end of said layer is a maximum for the turn next adjacent said one turn and decreases by substantially equal increments in proceeding from said one turn to the final turn at said one end of said layer.

4. An electrical transformer in accordance with claim 1 in which both windings are single layer windings and are coextensive.

5. An electrical transformer for frequencies of the order of one million cycles per second or more comprising a magnetic core, a winding on said core, a second winding on said core inductively coupled to said first winding and comprising a multiturn layer adjacent said first winding, a grounded electrostatic shield between said layer and said first winding and an electrical connection between said shield and one end of said layer, the turns of said layer adjacent said one end of said layer being more widely spaced from each other than the turns of said layer adjacent the other end of said layer.

6. An electrical transformer in accordance with claim 5 in which the turns of said layer are so spaced that the capacitance between each individual turn of said layer and said shield decreases substantially progressively from said one end of said layer to the other end of said layer.

7. An electrical transformer in accordance with claim 5 in which both windings are single layer windings and are coextensive.

ROBERT MUELLER.